(12) United States Patent
Tamaizumi et al.

(10) Patent No.: US 11,572,097 B2
(45) Date of Patent: Feb. 7, 2023

(54) STEERING CONTROLLER AND STEERING CONTROL METHOD

(71) Applicants: JTEKT CORPORATION, Osaka (JP); JTEKT EUROPE S.A.S., Irigny (FR)

(72) Inventors: Terutaka Tamaizumi, Okazaki (JP); Tahar Slama, Ecully (FR); Pascal Moulaire, Salvagny (FR); Pierre Larminy, Oullins (FR)

(73) Assignees: JTEKT CORPORATION, Osaka (JP); JTEKT EUROPE S.A.S., Irigny (FR)

( * ) Notice: Subject to any disclaimer, the term of this patent is extended or adjusted under 35 U.S.C. 154(b) by 462 days.

(21) Appl. No.: 16/735,744

(22) Filed: Jan. 7, 2020

(65) Prior Publication Data

US 2020/0223477 A1    Jul. 16, 2020

(30) Foreign Application Priority Data

Jan. 10, 2019    (JP) .............................. JP2019-002356

(51) Int. Cl.
   *B62D 7/15*     (2006.01)
   *B62D 5/04*     (2006.01)
   *B62D 15/02*    (2006.01)

(52) U.S. Cl.
   CPC ........... *B62D 7/159* (2013.01); *B62D 5/0463* (2013.01); *B62D 15/021* (2013.01)

(58) Field of Classification Search
   CPC .................................................. B60R 16/027
   See application file for complete search history.

(56) References Cited

U.S. PATENT DOCUMENTS

| 6,212,453 B1 | 4/2001 | Kawagoe et al. |
| 2017/0057540 A1* | 3/2017 | Anma ................... B62D 5/0463 |

(Continued)

FOREIGN PATENT DOCUMENTS

| DE | 19943410 A1 | 5/2000 |
| EP | 3 213 979 A1 | 9/2017 |

(Continued)

OTHER PUBLICATIONS

Jun. 2, 2020 Extended Search Report issued in European Patent Application No. 20305007.5.

(Continued)

*Primary Examiner* — Jeff A Burke
*Assistant Examiner* — Jerrod Irvin Davis
(74) *Attorney, Agent, or Firm* — Oliff PLC

(57) ABSTRACT

A steering controller includes processing circuitry configured to execute a first operation process that, when an angle command value is not input from outside of the processing circuitry, calculates a first torque command value corresponding to a steering-side operation amount and operating a drive circuit of an electric motor to adjust torque of the electric motor to the first torque command value. The processing circuitry is further configured to execute a second operation process that, when the angle command value is input from the outside of the processing circuitry, calculates a second torque command value corresponding to at least an angle-side operation amount of the steering-side operation amount and the angle-side operation amount and operating the drive circuit of the electric motor to adjust the torque of the electric motor to the second torque command value.

7 Claims, 4 Drawing Sheets

(56) References Cited

U.S. PATENT DOCUMENTS

2017/0259845 A1* 9/2017 Nozawa ................ B62D 5/049
2017/0297614 A1 10/2017 Minaki et al.
2021/0058018 A1* 2/2021 Tsuchimoto ............ H02P 21/22

FOREIGN PATENT DOCUMENTS

| JP | H02-128961 A | 5/1990 |
| JP | 2004-203089 A | 7/2004 |
| JP | 2004-249913 A | 9/2004 |
| JP | 2006-151360 A | 6/2006 |
| JP | 2010-098810 A | 4/2010 |
| JP | 2014-213779 A | 11/2014 |
| JP | 2017-222356 A | 12/2017 |

OTHER PUBLICATIONS

U.S. Appl. No. 16/735,762, filed Jan. 7, 2020 in the name of Tamaizumi et al.
Jan. 3, 2022 Office Action issued in European Patent Application No. 20305007.5.
Nov. 1, 2022 Office Action issued in Japanese Patent Application No. 2019-002355.
Nov. 1, 2022 Office Action issued in Japanese Patent Application No. 2019-002356.

* cited by examiner

STEERING CONTROLLER AND STEERING CONTROL METHOD

BACKGROUND

1. Field

The present disclosure relates to a steering controller and a steering control method for operating a steering actuator that incorporates an electric motor and steers steerable wheels.

2. Description of Related Art

Japanese Laid-Open Patent Publication No. 2004-203089 describes an example of a steering controller that operates an electric motor that is the power source for steering steerable wheels. The steering controller executes feedback control that adjusts the detection value of a steering torque by a driver to a target steering torque. The electric motor is operated based on the operation amount used for this feedback control.

Recently, consideration has been given to the establishment of a driving assistance system that assists the driving of a driver, such as an advanced driver assistance system (ADAS). However, in the above-described steering controller, even if the command value of a steerable angle is given from the outside as a driving assistance command value to assist driving, operating the electric motor in accordance with the command value of the steerable angle is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A steering controller for operating a steering actuator that incorporates an electric motor and steers a steerable wheel is provided. The steering controller includes processing circuitry configured to execute a steering-side operation amount calculation process that calculates a steering-side operation amount based on a steering torque input by a driver, the steering-side operation amount being an operation amount of the electric motor for steering the steerable wheel and being convertible into torque required for the electric motor, an angle-side operation amount calculation process that calculates an angle-side operation amount when an angle command value is input from outside of the processing circuitry, the angle command value being used to assist driving of the driver and being a command value of a convertible angle convertible into a steerable angle of the steerable wheel, the angle-side operation amount being used to adjust the convertible angle to the angle command value and being convertible into the torque required for the electric motor, a first operation process that, when the angle command value is not input from the outside of the processing circuitry, calculates a first torque command value corresponding to the steering-side operation amount and operating a drive circuit of the electric motor to adjust the torque of the electric motor to the first torque command value, and a second operation process that, when the angle command value is input from the outside of the processing circuitry, calculates a second torque command value corresponding to at least the angle-side operation amount of the steering-side operation amount and the angle-side operation amount and operating the drive circuit of the electric motor to adjust the torque of the electric motor to the second torque command value.

When the first operation process is executed to adjust the torque of the electric motor to the first torque command value corresponding to the steering-side operation amount, even if the angle command value is input from the outside of the processing circuitry, changing the adjustment of the torque of the electric motor in accordance with the angle command value is difficult. In the above-described configuration, the angle-side operation amount calculation process is executed to calculate the angle-side operation amount, which is used to adjust the convertible angle to the angle command value. Further, the second operation process is executed to operate the drive circuit in accordance with the angle-side operation amount. This allows the torque of the electric motor to be adjusted in accordance with the angle command value. As a result, the electric motor can be operated in accordance with an input of the command value that assists driving.

Example 2: In the steering controller according to Example 1, the second operation process includes a process that operates the drive circuit of the electric motor to adjust the torque of the electric motor to the second torque command value corresponding to both the steering-side operation amount and the angle-side operation amount.

In the above-described configuration, when the angle command value is input from the outside of the processing circuitry, the second operation process is executed to adjust the torque of the electric motor to the second torque command value corresponding to both the steering-side operation amount and the angle-side operation amount. This allows the torque of the electric motor to be adjusted to a value in which the torque corresponding to the intention of steering by the driver is superimposed on the torque for assisting the driving from the outside.

Example 3: In the steering controller according to Example 1 or 2, the second operation process includes a varying process that varies at least one of a gain indicating a degree to which the steering-side operation amount affects the second torque command value or a gain indicating a degree to which the angle-side operation amount affects the second torque command value.

In the above-described configuration, the varying process is executed to allow a change in whether the command value for supporting driving or steering by the driver is prioritized.

Example 4: In the steering controller according to any one of Examples 1 to 3, the steering-side operation amount is used for feedback control that adjusts the steering torque to a target torque.

In the above-described configuration, the feedback control that adjusts the steering torque to the target torque is executed. Thus, as compared to when the feedback control is not executed, the controllability of the target torque is improved. This improves the steering feel of the driver.

Example 5: In the steering controller according to Example 4, the processing circuitry is configured to execute a target torque calculation process that calculates the target torque, and the target torque calculation process includes obtaining a conversion amount by converting each of the steering-side operation amount and the steering torque into force acting on a same object, and calculating the target torque based on a sum of the conversion amounts.

The steering-side operation amount can be converted into the torque required for the electric motor. Thus, the steering-side operation amount and the steering torque determine the force applied from the vehicle to steer the steerable wheel. This force determines the side force. The target torque required to improve the steering feel by the driver tends to be determined by the side force. Thus, in the above-described configuration, determining the target torque based on the sum facilitates the designing of the target torque calculation process.

Example 6: In the steering controller according to any one of Examples 1 to 5, the processing circuitry is configured to execute a third operation process that calculates a third torque command value corresponding to the steering-side operation amount instead of the angle-side operation amount and operating the drive circuit of the electric motor to adjust the torque of the electric motor to the third torque command value in a case in which an absolute value of the steering torque is greater than or equal to a predetermined value even when the angle command value is input from the outside of the steering controller.

In the above-described configuration, even when the angle command value is input from the outside of the processing circuitry, when the steering torque becomes excessively large, the torque of the electric motor is adjusted to the third torque command value determined by the steering-side operation amount. Thus, when the driver turns the steering wheel to a large extent to avoid an emergency or the like, the steering intended by the driver can be assisted.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A steering controller 40 according to a first embodiment will now be described with reference to the drawings.

Figure 1:
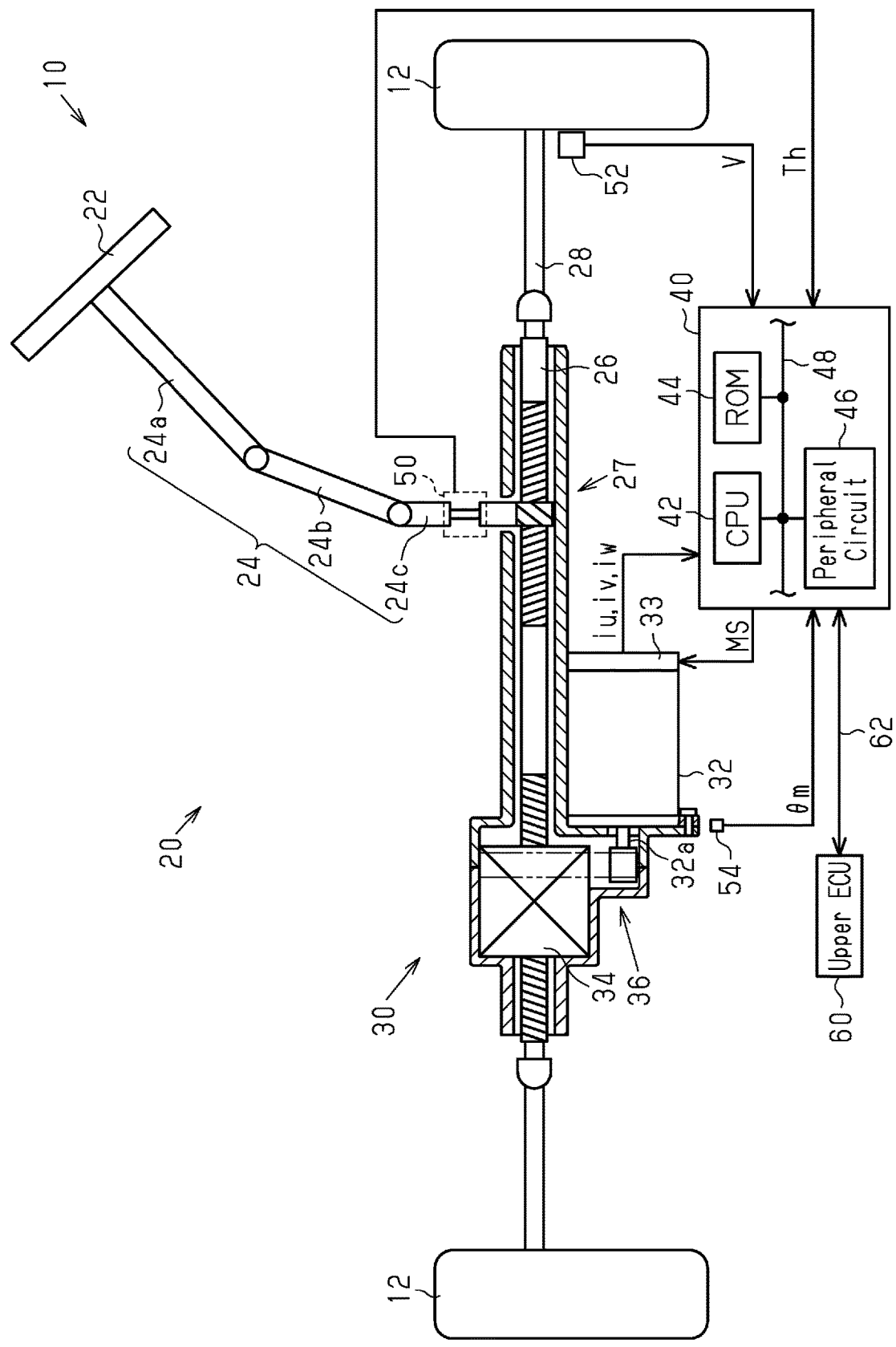
FIG. 1 is a diagram showing an electric power steering according to a first embodiment.

As shown in FIG. 1, an electric power steering 10 includes a steering mechanism 20, which steers steerable wheels 12 based on the operation of a steering wheel 22 performed by a driver, and a steering actuator 30, which electrically steers the steerable wheels 12.

The steering mechanism 20 includes the steering wheel 22, a steering shaft 24, which is fixed to the steering wheel 22, and a rack-and-pinion mechanism 27. The steering shaft 24 includes a column shaft 24a, which is coupled to the steering wheel 22, an intermediate shaft 24b, which is coupled to the lower end of the column shaft 24a, and a pinion shaft 24c, which is coupled to the lower end of the intermediate shaft 24b. The lower end of the pinion shaft 24c is coupled to a rack shaft 26 by the rack-and-pinion mechanism 27. The rack-and-pinion mechanism 27 includes the pinion shaft 24c and the rack shaft 26. The opposite ends of the rack shaft 26 are respectively coupled to the left and right steerable wheels 12 by a tie rod 28. Thus, the rack-and-pinion mechanism 27 converts rotation of the steering wheel 22 (i.e., rotation of the steering shaft 24) into reciprocation of the rack shaft 26 in the axial direction. The reciprocation is transmitted to the steerable wheels 12 from the tie rod 28, which is coupled to the opposite ends of the rack shaft 26, thereby changing the steerable angles of the steerable wheels 12. The axial direction of the rack shaft 26 corresponds to the sideward direction in FIG. 1.

The steering actuator 30 shares the rack shaft 26 with the steering mechanism 20. Further, the steering actuator 30 includes an electric motor 32, an inverter 33, a ball screw mechanism 34, and a belt reduction drive 36. The electric motor 32 is the generator of power that steers the steerable wheels 12. In the present embodiment, a three-phase surface permanent magnet synchronous motor (SPMSM) is exemplified as the electric motor 32. The ball screw mechanism 34 is arranged around the rack shaft 26 and coupled to the rack shaft 26. The belt reduction drive 36 transmits rotation force of an output shaft 32a of the electric motor 32 to the ball screw mechanism 34. The ball screw mechanism 34 and the belt reduction drive 36 convert the rotation force of the output shaft 32a of the electric motor 32 into force that reciprocates the rack shaft 26 in the axial direction. The axial force given to the rack shaft 26 steers the steerable wheels 12.

The steering controller 40 controls the steerable wheels 12. The steering controller 40 operates the steering actuator 30 in order to control a steerable angle, which is the control amount of each steerable wheel 12. When controlling the control amount, the steering controller 40 refers to the state quantities detected by various sensors. The state quantities include a steering torque Th, which is detected by a torque sensor 50, and a vehicle speed V, which is detected by a vehicle speed sensor 52. The steering torque Th is input by the driver via the steering wheel 22. The state quantities also include a rotation angle θm of the output shaft 32a, which is detected by a rotation angle sensor 54, and include current iu, current iv, and current iw, which flow through the electric motor 32. The current iu, the current iv, and the current iw can be detected based on voltage drop caused by the shunt resistor of each leg of the inverter 33.

The steering controller 40 is capable of executing communication with an upper ECU 60 via a communication line 62. The upper ECU 60 has a function of outputting, to the steering controller 40, a command value to assist the driving of a driver. That is, the command value to assist the driving of the driver from the upper ECU 60, which is the outside of the steering controller 40, is input to the steering controller 40.

The steering controller 40 includes a CPU 42, a ROM 44, and a peripheral circuit 46. The CPU 42, the ROM 44 and the peripheral circuit 46 are connected to one another by a communication line 48. The peripheral circuit 46 includes various circuits such as a circuit that generates a clock signal specifying an internal operation, a power supply circuit, and a reset circuit.

Figure 2:
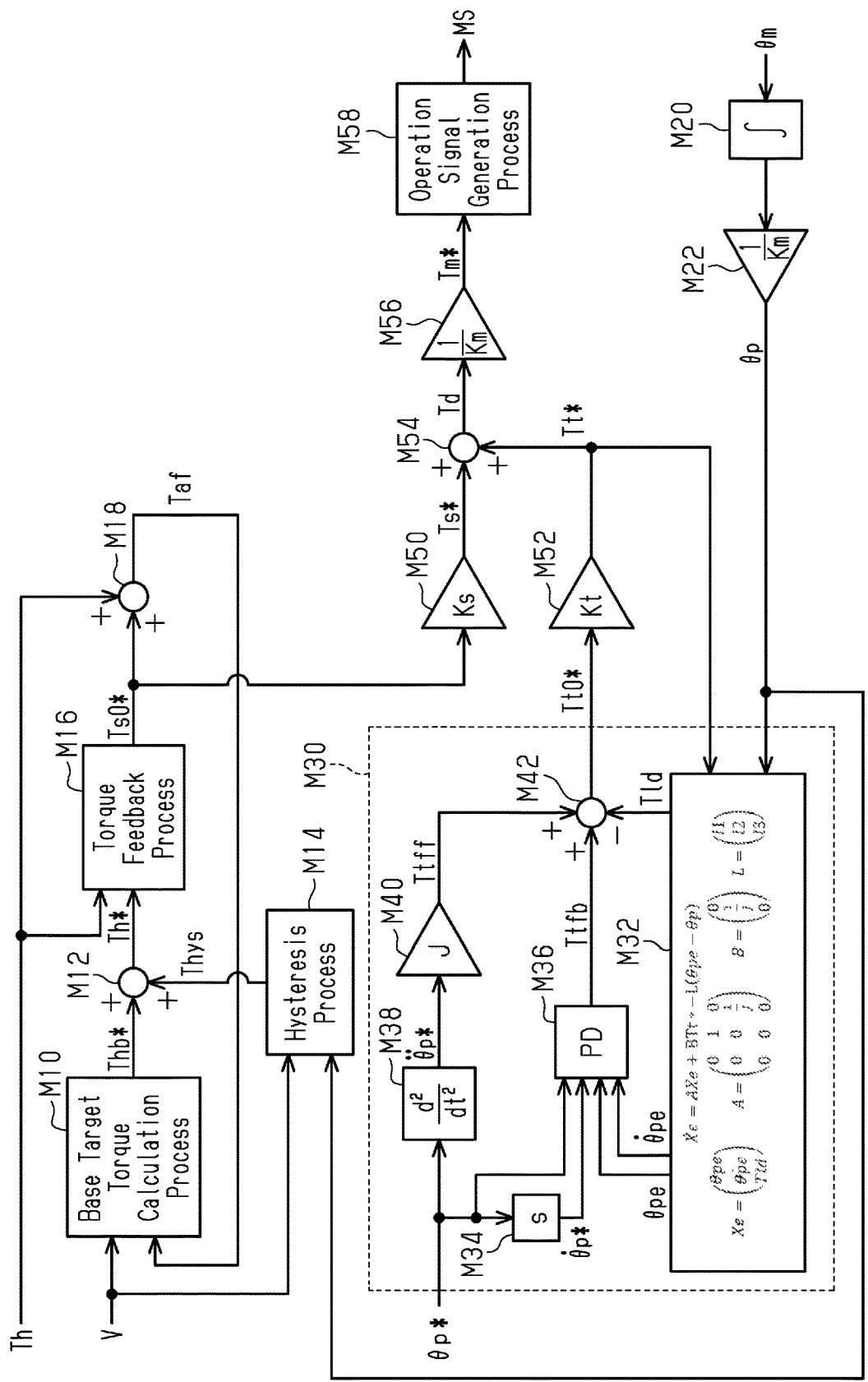
FIG. 2 is a block diagram illustrating processes executed by the steering controller of the first embodiment.

FIG. 2 shows part of the processes executed by the steering controller 40. The processes of FIG. 2 are implemented by the CPU 42 executing programs stored in the ROM 44.

A base target torque calculation process M10 is a process for calculating a base target torque Thb* based on an axial force Taf, which will be described later. The base target torque Thb* is the base value of a target torque Th*, which should be input by the driver to the steering shaft 24 via the steering wheel 22.

The axial force Taf is force applied to the rack shaft 26 in the axial direction. The axial force Taf has an amount corresponding to a side force acting on each steerable wheel 12. Thus, the side force can be obtained from the axial force Taf. It is desired that the side force be used to determine the torque that should be input by the driver to the steering shaft 24 via the steering wheel 22. Accordingly, the base target torque calculation process M10 calculates the base target torque Thb* in accordance with the side force obtained from the axial force Taf.

More specifically, even if the absolute value of the axial force Taf is the same, the base target torque calculation process M10 calculates the absolute value of the base target torque Thb* to be smaller when the vehicle speed V is low than when the vehicle speed V is high. This can be achieved by, for example, the CPU 42 obtaining the base target torque Thb* through map calculation in a state in which map data is stored in the ROM 44 in advance.

The map data refers to a data set of discrete values of input variables and values of output variables each corresponding to a value of the input variables. In the map data stored in the ROM 44, the axial force Taf or a lateral acceleration obtained from the axial force Taf and the vehicle speed V.

For example, when the value of an input variable matches one of the values of input variables on the map data, the map calculation uses the value of the corresponding output variable of the map data as the calculation result. When the value of the input variable does not match any of the values of the input variable on the map data, a value obtained by interpolation of multiple values of the output variable included in the map data is used as the calculation result.

A hysteresis process M14 is a process for calculating and outputting a hysteresis correction amount Thys, which is used to correct the base target torque Thb*, based on a pinion angle θp, which is the rotation angle of the pinion shaft 24c. The pinion angle θp is a convertible angle that can be converted into the steerable angle of each steerable wheel 12. More specifically, the hysteresis process M14 includes a process for calculating the hysteresis correction amount Thys such that the absolute value of the target torque Th* is larger when steering the steering wheel 22 than when returning the steering wheel 22. The hysteresis process M14 distinguishes the steering period from the returning period of the steering wheel 22 based on, for example, changes in the pinion angle θp. The hysteresis process M14 includes a process for variably setting the hysteresis correction amount Thys in accordance with the vehicle speed V.

An addition process M12 is a process for calculating the target torque Th* by adding the hysteresis correction amount Thys to the base target torque Thb*.

A torque feedback process M16 is a process for calculating a steering-side operation amount Ts0*, which is an operation amount used for feedback control to adjust the steering torque Th to the target torque Th*. The steering-side operation amount Ts0* includes an operation amount used for feedback control that adjusts the steering torque Th to the target torque Th*, i.e., a feedback operation amount. The feedback operation amount is used to increase the absolute value of a required torque for the electric motor 32 when, for example, the steering torque Th and the target torque Th* are both positive and the steering torque Th is larger than the target torque Th*. The steering-side operation amount Ts0* is an amount corresponding to the required torque for the electric motor 32 and is also an amount converted into torque applied to the steering shaft 24 in the present embodiment.

An axial force calculation process M18 is a process for calculating the axial force Taf by adding the steering torque Th to the steering-side operation amount Ts0*. The steering torque Th is torque applied to the steering shaft 24. Thus, in the present embodiment, the axial force Taf is a value obtained by converting, into the torque applied to the steering shaft 24, force applied in the axial direction of the rack shaft 26.

An integration process M20 is a process for calculating an integration value Inθ of the rotation angle θm of the electric motor 32. In the present embodiment, the steerable angle of the steerable wheel 12 is set to 0 when the vehicle travels straight, and the integration value Inθ is set to 0 when the steerable angle is 0. A conversion process M22 is a process for calculating the pinion angle θp by dividing the integration value Inθ by a deceleration ratio Km from the steering shaft 24 to the electric motor 32.

An angle-side operation amount calculation process M30 is a process for calculating an angle-side operation amount Tt0*, which is an operation amount for adjusting the pinion angle θp to a pinion angle command value θp*. The pinion angle command value θp* is an angle command value input from the upper ECU 60. The angle-side operation amount Tt0* is an amount corresponding to the required torque for the electric motor 32 and is also an amount converted into torque applied to the steering shaft 24 in the present embodiment.

The angle-side operation amount calculation process M30 includes a disturbance observer M32, which estimates a disturbance torque Tld. The disturbance torque Tld is torque excluded from the torque that affects the pinion angle θp other than an angle-side operation amount Tt*, which is obtained by correcting the angle-side operation amount Tt0* through a process that will be described later. The disturbance torque Tld includes, for example, the steering torque Th and the steering-side operation amount Ts0*.

In the present embodiment, the disturbance torque Tld is converted into the torque added to the steering shaft 24. The disturbance observer M32 estimates the disturbance torque Tld with the following expression (c1) using the angle-side operation amount Tt* converted into the torque of the steering shaft 24.

$$J \cdot \theta p^{*''} = Tt^* + Tld \qquad (c1)$$

More specifically, in the present embodiment, the disturbance observer M32 calculates the disturbance torque Tld and an estimated value θpe with the following expression (c2) using a matrix L with three rows and one column, which specifies the estimated value θpe of the pinion angle θp, the angle-side operation amount Tt*, and observer gains l1, l2, and l3.

$$\dot{X}e = AXe + BTt* - L(\theta pe - \theta p) \qquad (c2)$$

$$Xe = \begin{pmatrix} \theta pe \\ \dot{\theta} pe \\ Tld \end{pmatrix} \quad A = \begin{pmatrix} 0 & 1 & 0 \\ 0 & 0 & \frac{1}{J} \\ 0 & 0 & 0 \end{pmatrix} \quad B = \begin{pmatrix} 0 \\ \frac{1}{J} \\ 0 \end{pmatrix} \quad L = \begin{pmatrix} l1 \\ l2 \\ l3 \end{pmatrix}$$

A differentiation calculation process M34 is a process for calculating a pinion angular velocity command value by differentiating the pinion angle command value θp*.

A feedback term calculation process M36 is a process for calculating a feedback operation amount Ttfb, which is the sum of the output value of a proportional element having the difference between the pinion angle command value θp* and the estimated value θpe as an input and the output value of a differential element having the differential value of the difference as an input.

A second order differential process M38 is a process for calculating a second order time differential value of the pinion angle command value θp*. A feedforward term calculation process M40 is a process for calculating a feedforward operation amount Ttff by multiplying an output value of the second order differential process M38 by the inertia coefficient J. A two-degree-of-freedom operation amount calculation process M42 is a process for calculating the angle-side operation amount Tt0* by subtracting the disturbance torque Tld from the sum of the feedback operation amount Ttfb and the feedforward operation amount Ttff.

A steering-side gain process M50 is a process for outputting a steering-side operation amount Ts*, which is a value obtained by multiplying the steering-side operation amount Ts0* by a steering-side gain Ks. The steering-side gain Ks has a value greater than or equal to 0 and less than or equal to 1.

An angle-side gain process M52 is a process for outputting the angle-side operation amount Tt*, which is a value obtained by multiplying the angle-side operation amount Tt0* by an angle-side gain Kt. The angle-side gain Kt has a value greater than or equal to 0 and less than or equal to 1.

An addition process M54 is a process for calculating the required torque Td for the electric motor 32 by adding the steering-side operation amount Ts* and the angle-side operation amount Tt*.

A conversion process M56 is a process for converting the required torque Td into a torque command value Tm*, which is a command value of the torque for the electric motor 32, by dividing the required torque Td by the deceleration ratio Km.

An operation signal generation process M58 is a process for generating and outputting an operation signal MS of the inverter 33, which is used to adjust the torque output by the electric motor 32 to the torque command value Tm*. The operation signal MS is actually an operation signal for each leg of the inverter 33.

Figure 3:
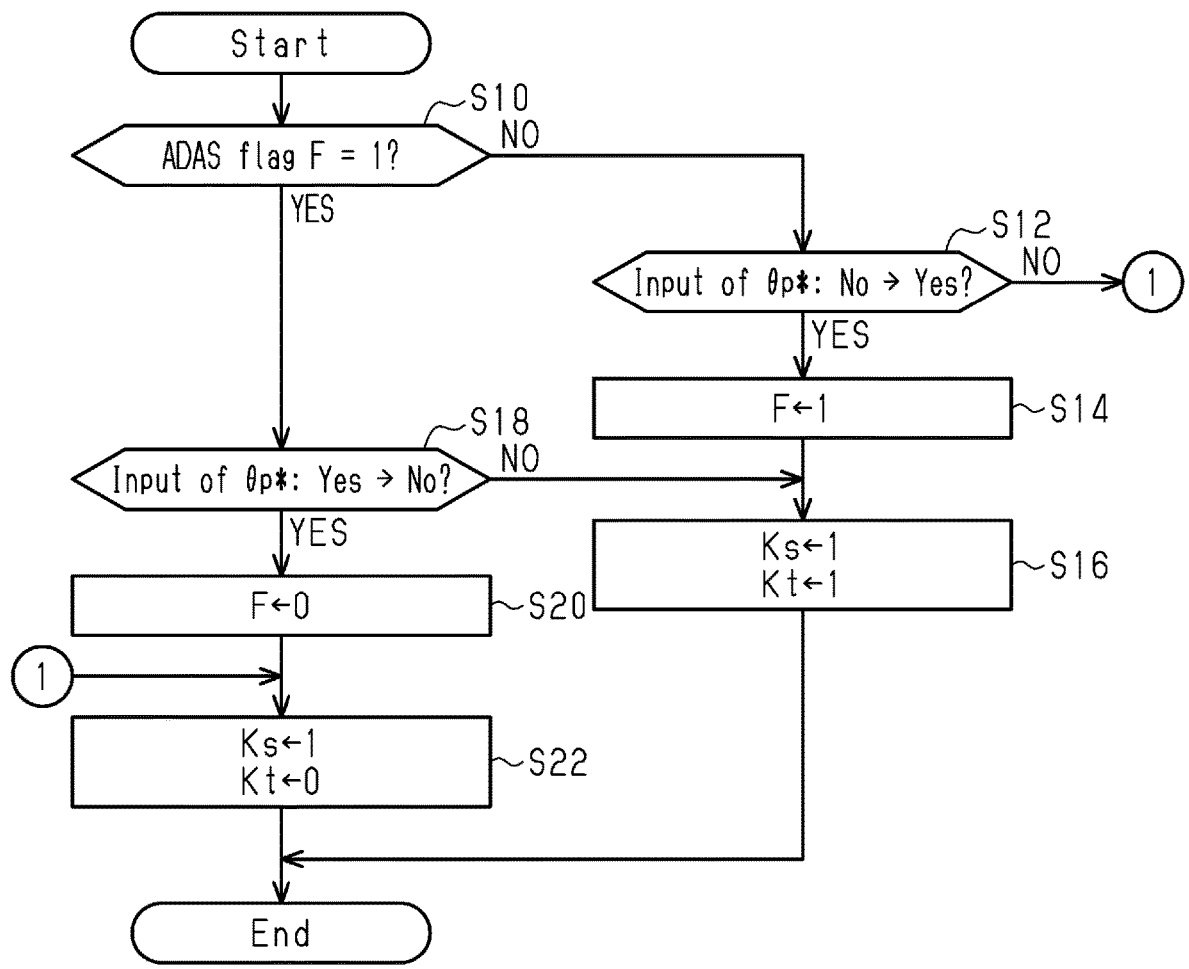
FIG. 3 is a flowchart illustrating a procedure for processes executed by the steering controller of the first embodiment.

FIG. 3 shows a procedure for processes of setting the steering-side gain Ks and the angle-side gain Kt. The steering-side gain Ks indicates a degree to which the steering-side operation amount Ts0* affects the torque command value Tm*. The angle-side gain Kt indicates a degree to which the angle-side operation amount Tt0* affects the torque command value Tm*. The process shown in FIG. 3 is executed by the CPU 42 repeatedly executing programs stored in the ROM 44, for example, at a predetermined interval. In the following description, the number of each step is represented by the letter S followed by a numeral.

In a series of processes shown in FIG. 3, the CPU 42 first determines whether an ADAS flag F is 1 (S10). When the ADAS flag F is 1, the ADAS flag F indicates that the pinion angle command value θp* is input from the upper ECU 60. When the ADAS flag F is 0, the ADAS flag F indicates that the pinion angle command value θp* is not input from the upper ECU 60.

When determining that the ADAS flag F is 0 (S10: NO), the CPU 42 determines whether the current point in time is the point in time when a state in which there is no input of the pinion angle command value θp* has shifted to a state in which there is an input of the pinion angle command value θp* (S12). In a case in which the pinion angle command value θp* was not input at the previous timing of executing the series of processes shown in FIG. 3 and the pinion angle command value θp* is input at the current timing of executing the processes, the current point in time is the point in time when the shifting has been made (S12: YES). In this case, the CPU 42 substitutes 1 into the ADAS flag F (S14). The CPU 42 substitutes 1 into the steering-side gain Ks and also substitutes 1 into the angle-side gain Kt (S16).

When determining that the ADAS flag F is 1 (S10: YES), the CPU 42 determines whether the current point in time is the point in time when the state in which there is an input of the pinion angle command value θp* has shifted to the state in which there is no input of the pinion angle command value θp* (S18). When determining that the current point in time is not the point in time at which the shifting has been made (S18: NO), the CPU 42 proceeds to the process of S16.

In a case in which the pinion angle command value θp* was input at the previous timing of executing the series of processes shown in FIG. 3 and the pinion angle command value θp* is not input at the current timing of executing the processes, the current point in time is the point in time when the shifting has been made (S18: YES). In this case, the CPU 42 substitutes 0 into the ADAS flag F (S20). When completing the process of S20 and making a negative determination in the process of S12, the CPU 42 substitutes 1 into the steering-side gain Ks and also substitutes 0 to the angle-side gain Kt (S22).

When completing the process of step S16 or S22, the CPU 42 temporarily ends the series of processes shown in FIG. 3.

The operation and advantages of the present embodiment will now be described.

When the pinion angle command value θp* is not input to the CPU 42 from the upper ECU 60, which is the outside of the steering controller 40, the CPU 42 adjusts the torque of the electric motor 32 to the torque command value Tm*, which is determined by the steering-side operation amount Ts0*, which is used for the feedback control to adjust the steering torque Th to the target torque Th*. Thus, the torque of the electric motor 32 is adjusted such that the steering torque Th becomes the target torque Th*. This improves the steering feel.

When the pinion angle command value θp* is input to the CPU 42 from the upper ECU 60, which is the outside of the steering controller 40, the CPU 42 adjusts the torque of the electric motor 32 to the torque command value Tm*, which is determined by the sum of the steering-side operation amount Ts0* and the angle-side operation amount Tt0*, which is used for the feedback control to adjust the pinion angle θp to the pinion angle command value θp*. Thus, since the pinion angle θp is adjusted to follow the pinion angle command value θp*, the assistance of driving from the upper ECU 60 can be reflected.

When the steering-side gain Ks and the angle-side gain Kt are both 1, the disturbance torque Tld estimated by the disturbance observer M32 includes the steering torque Th and the steering-side operation amount Ts0*. Thus, for example, when the second order time differential value of the pinion angle command value θp* is not zero, in the two-degree-of-freedom operation amount calculation process M42, at least the steering torque Th and the steering-side operation amount Ts0* are subtracted from the feed-forward operation amount Ttff, which is the torque for generating a necessary acceleration for the pinion angle θp.

Second Embodiment

A second embodiment will now be described with reference to the drawings. The differences from the first embodiment will mainly be discussed.

In the above-described first embodiment, when the pinion angle command value θp* is input to the steering controller 40 from the outside, the steering-side gain Ks and the angle-side gain Kt are both set to 1. In the second embodiment, gains are varied depending on a situation.

Figure 4:
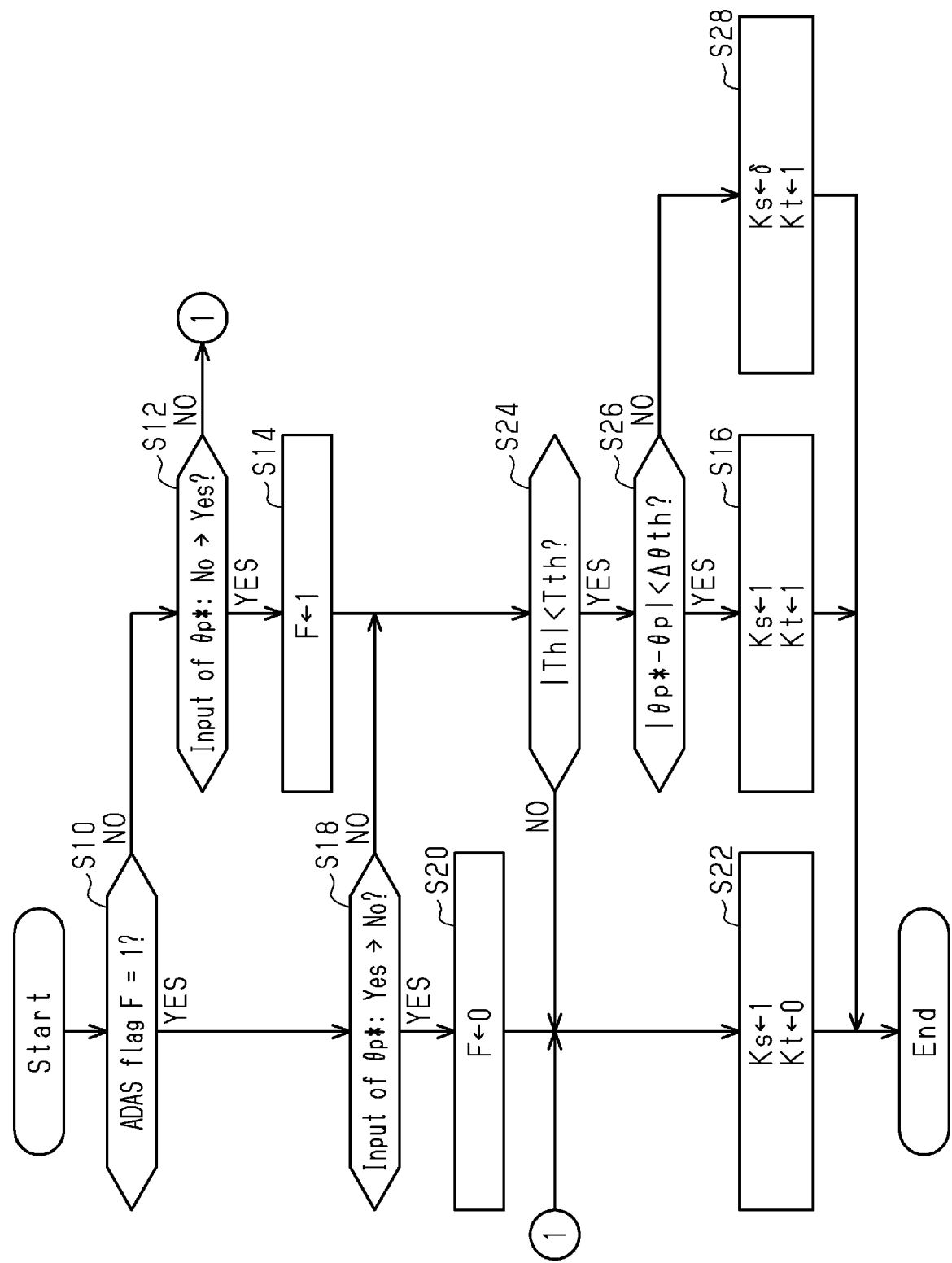
FIG. 4 is a flowchart illustrating a procedure for processes executed by the steering controller of a second embodiment.

FIG. 4 shows a procedure for processes of setting the steering-side gain Ks and the angle-side gain Kt in the present embodiment. The process shown in FIG. 4 is executed by the CPU 42 repeatedly executing programs stored in the ROM 44, for example, at a predetermined interval. In FIG. 4, the processes corresponding to the processes shown in FIG. 3 are given the same step numbers for the illustrative purposes and the explanation is omitted.

In a series of processes shown in FIG. 4, when completing the process of S14 or making a negative determination in the process of S18, the CPU 42 determines whether the absolute value of the steering torque Th is less than a predetermined value Tth (S24). The predetermined value Tth is set to the absolute value of the steering torque Th that may occur when the driver suddenly turns the steering wheel 22 to avoid an emergency or the like. When determining that the absolute value of the steering torque Th is greater than or equal to the predetermined value Tth (S24: NO), the CPU 42 substitutes 1 into the steering-side gain Ks and substitutes 0 into the angle-side gain Kt to prioritize the steering by the driver (S22).

When determining that the absolute value of the steering torque Th is less than the predetermined value Tth (S24: YES), the CPU 42 determines whether the absolute value of the difference between the pinion angle command value θp* and the pinion angle θp is less than a predetermined value Δθth (S26). The predetermined value Δθth is set to be larger than the maximum value of the absolute value of the difference between the pinion angle command value θp* and the pinion angle θp that may occur when the steering torque Th is not excessively large and the steering executed by the driver does not greatly deviate from the steering intended by the upper ECU 60. When determining that the above-described difference is greater than or equal to the predetermined value Δθth (S26: NO), the CPU 42 substitutes a predetermined value δ, which is larger than 0 and smaller than 1, into the steering-side gain Ks and substitutes 1 into the angle-side gain Kt (S28). When making an affirmative determination in the process of S26, the CPU 42 proceeds to the process of S16.

The operation and advantages of the present embodiment will now be described.

Even if the pinion angle command value θp* is input to the CPU 42 from the upper ECU 60, which is the outside of the steering controller 40, when the steering torque Th becomes excessively large, the CPU 42 sets the steering-side gain Ks to 1 and sets the angle-side gain Kt to 0. This causes the CPU 42 to adjust the torque of the electric motor 32 to the torque command value Tm*, which is determined by the steering-side operation amount Ts0*. Thus, when the driver turns the steering wheel 22 to a large extent to avoid an emergency, the steering intended by the driver can be assisted.

When the steering torque Th is not excessively large and the pinion angle command value θp* and the pinion angle θp greatly deviate from each other, the CPU 42 sets the steering-side gain Ks to a value smaller than 1 so that the angle-side operation amount Tt0* dominantly affects the torque command value Tm*. This causes the pinion angle command value θp* to easily follow the pinion angle θp.

Correspondence

The correspondence between the items in the above embodiments and the items described in the above-described SUMMARY is as follows. In the following description, the correspondence is shown for each of the numbers in the examples described in the SUMMARY.

In Examples 1, 2, and 4, the "steering-side operation amount calculation process" corresponds to the base target torque calculation process M10, the addition process M12, the hysteresis process M14, and the torque feedback process M16. The "convertible angle" corresponds to the pinion angle θp. The "first operation process" corresponds to the addition process M54, the conversion process M56, and the operation signal generation process M58 when the angle-side gain Kt is 0. The "first torque command value" corresponds to the torque command value Tm* when the angle-side gain Kt is 0. The "second operation process" corresponds to the addition process M54, the conversion process M56, and the operation signal generation process M58 when the angle-side gain Kt is larger than 0. The "second torque command value" corresponds to the torque command value Tm* when the angle-side gain Kt is larger than 0. The "drive circuit" corresponds to the inverter 33.

In Example 3, the "varying process" corresponds to the processes of S16 and S28 responding to the process of S26 in FIG. 4.

In Example 5, the "target torque calculation process" corresponds to the base target torque calculation process M10, the addition process M12, and the hysteresis process M14.

In Example 6, the "third operation process" corresponds to the addition process M54, the conversion process M56, and the operation signal generation process M58 when a negative determination is made in the process of S24 in FIG. 4 and, as a result of the process of S22, the steering-side gain Ks becomes 1 and the angle-side gain Kt becomes 0. The "third torque command value" corresponds to the torque command value Tm* when the steering-side gain Ks is 1 and the angle-side gain Kt is 0.

Modifications

At least one of the features of the above-described embodiment may be modified as follows.

Varying Process

When a negative determination is made in the process of S24 in FIG. 4, the substitution of 0 into the angle-side gain Kt is not necessary. Instead, for example, a value smaller than 1 and larger than 0 may be substituted into the angle-side gain Kt.

In addition, the steering-side gain Ks and the angle-side gain Kt do not have to be changed. For example, a guard process for setting the absolute value of the angle-side operation amount Tt0* to be less than or equal to a guard value may be executed, and a process for reducing the guard value of the absolute value of the angle-side operation amount Tt0* to a small value may be executed when a negative determination is made in the process of S24 in FIG. 4. Because of this process, the angle-side operation amount Tt0* that is input to the addition process M54 and is obtained subsequent to the execution of the guard process becomes smaller than the angle-side operation amount Tt0* that is output by the angle-side operation amount calculation process M30 and is obtained prior to the execution of the guard process. This decrease is equivalent to a change in the angle-side gain Kt from 1 to a value smaller than 1.

Disturbance Observer

For example, in the two-degree-of-freedom operation amount calculation process M42 of the above-described embodiment, not only the disturbance torque Tld but also the steering-side operation amount Ts* may be subtracted from the sum of the feedback operation amount Ttfb and the feedforward operation amount Ttff, and the value used as an input of the disturbance observer M32 may be changed from the angle-side operation amount Tt* to Tt*+Ts*. In this case, the disturbance torque Tld is torque excluded from the torque that affects the pinion angle θp other than the torque of the electric motor 32.

Alternatively, for example, in the two-degree-of-freedom operation amount calculation process M42 of the above-described embodiment, not only the disturbance torque Tld but also the steering-side operation amount Ts* and the steering torque Th may be subtracted from the sum of the feedback operation amount Ttfb and the feedforward operation amount Ttff, and the value used as an input of the disturbance observer M32 may be changed from the angle-side operation amount Tt* to Tt*+Ts*+Th. In this case, the disturbance torque Tld is torque excluded from the torque that affects the pinion angle θp other than the sum of the torque of the electric motor 32 and the steering torque Th.

The disturbance torque Tld does not have to be calculated in the manner illustrated in the above-described embodiment. For example, the disturbance torque Tld may be calculated by subtracting the angle-side operation amount Tt*, the steering-side operation amount Ts*, and the steering torque Th from a value obtained by multiplying the inertia coefficient J by the second order time differential value of the pinion angle command value θp*. Alternatively, the disturbance torque Tld may be calculated by subtracting the angle-side operation amount Tt*, the steering-side operation amount Ts*, and the steering torque Th from a value obtained by multiplying the inertia coefficient J by the second order time differential value of the pinion angle θp. As another option, the disturbance torque Tld may be calculated by subtracting the angle-side operation amount Tt*, the steering-side operation amount Ts*, and the steering torque Th from a value obtained by multiplying the inertia coefficient J by the second order time differential value of the estimated value θpe.

Angle Feedback Process

In the above-described embodiment, the feedforward operation amount Ttff is calculated based on a second order time differential value of the pinion angle command value θp*. Instead, the feedforward operation amount Ttff may be calculated based on, for example, the second order time differential value of the pinion angle θp. Alternatively, the feedforward operation amount Ttff may be calculated based on, for example, the second order time differential value of the difference between the pinion angle command value θp* and the pinion angle θp.

The feedback control amount input to the feedback term calculation process M36 is not limited to the estimated value θpe or the first order time differential value of the estimated value θpe. Instead, the feedback control amount may be the pinion angle θp or the time differential value of the pinion angle θp.

The feedback term calculation process M36 is not limited to the process for outputting the sum of the output value of the proportional element and the output value of the differential element. Instead, for example, the feedback term calculation process M36 may be a process for outputting the output value of the proportional element or may be a process for outputting the output value of the differential element. Alternatively, the feedback term calculation process M36 may be a process for outputting the sum of the output value of the integral element and at least one of the output value of the proportional element and the output value of the differential element.

Angle-Side Operation Amount Calculation Process

The angle-side operation amount calculation process M30 does not have to include the feedback term calculation process M36 or the disturbance observer M32. The angle-side operation amount calculation process M30 may be a process for, for example, setting the feedforward operation amount Ttff to the angle-side operation amount Tt*.

Steering-Side Operation Amount Calculation Process

The steering-side operation amount calculation process does not have to be a process for calculating the steering-side operation amount Ts* as an operation amount used for the feedback control that adjusts the steering torque Th to the target torque Th*. The steering-side operation amount calculation process may be only a process for, for example, calculating, as the steering-side operation amount Ts*, an assist torque that assists steering based on the steering torque Th. Even in this case, steering the steerable wheels 12 with the intention of the user is assisted by using the steering-side operation amount Ts*. Thus, the steering-side operation amount Ts* is an operation amount of the electric motor 32 for steering the steerable wheels 12.

Convertible Angle

In the above-described embodiment, the pinion angle θp is used as the convertible angle. Instead, for example, the steerable angle of the steerable wheel may be used as the convertible angle.

Steering-Side Operation Amount

In the above-described embodiment, the steering-side operation amount Ts* is converted into the torque of the steering shaft 24. Instead, for example, the steering-side operation amount Ts* may be converted into the torque of the electric motor 32.

Angle-Side Operation Amount

In the above-described embodiment, the angle-side operation amount Tt* is converted into the torque of the steering shaft 24. Instead, for example, the angle-side operation amount Tt* may be converted into the torque of the electric motor 32.

Target Torque Calculation Process

The base target torque calculation process M10 is not limited to a process for calculating the base target torque Thb* in accordance with the axial force Taf and the vehicle speed V. Instead, for example, the base target torque calculation process M10 may be a process for calculating the base target torque Thb* only based on the axial force Taf.

The base target torque Thb* does not have to be corrected with the hysteresis correction amount Thys.

Base Target Torque

The base target torque Thb* does not have to be obtained based on the axial force Taf. Instead, for example, an assist torque that assists steering may be calculated based on the steering torque Th, and the base target torque Thb* may be calculated based on the sum of the assist torque and the steering torque.

Steering Controller

The steering controller is not limited to a device that includes the CPU 42 and the ROM 44 and executes software processing. For example, a dedicated hardware circuit (such as an ASIC) may be provided that executes at least part of the software processes executed in the above-described embodiment. That is, the steering controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above-described processes may be executed in any manner as long as the processes are executed by processing circuitry that includes at least one of a set of one or more software processing circuits and a set of one or more dedicated hardware circuits.

Electric Motor, Drive Circuit

The electric motor is not limited to a SPMSM and may be an interior permanent magnet synchronous motor (IPMSM). Alternatively, the electric motor is not limited to a synchronous motor and may be an induction motor. As another option, the electric motor may be, for example, a brushed direct-current electric motor. In this case, an H bridge circuit simply needs to be employed for the drive circuit.

Steering Actuator

The steering actuator 30 does not have to be the actuator illustrated in the above-described embodiment. The steering actuator 30 may be of, for example, a dual pinion type including a second pinion shaft that transmits the power of the electric motor 32 to the rack shaft 26 in addition to the pinion shaft 24c. Further, in the steering actuator 30, the output shaft 32a of the electric motor 32 may be mechanically coupled to the steering shaft 24. In this case, the steering actuator 30 and the steering mechanism 20 share the steering shaft 24 and the rack-and-pinion mechanism 27.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A steering controller for operating a steering actuator that incorporates an electric motor and steers a steerable wheel, wherein the steering controller comprises processing circuitry configured to execute:
   a steering-side operation amount calculation process that calculates a steering-side operation amount based on a steering torque input by a driver, the steering-side operation amount being an operation amount of the electric motor for steering the steerable wheel and being convertible into torque required for the electric motor;
   an angle-side operation amount calculation process that calculates an angle-side operation amount when an angle command value is input from outside of the processing circuitry, the angle command value being used to assist driving of the driver and being a command value of a convertible angle convertible into a steerable angle of the steerable wheel, the angle-side operation amount being used to adjust the convertible angle to the angle command value and being convertible into the torque required for the electric motor;
   a first operation process that, when the angle command value is not input from the outside of the processing circuitry, calculates a first torque command value corresponding to the steering-side operation amount and operating a drive circuit of the electric motor to adjust the torque of the electric motor to the first torque command value; and
   a second operation process that, when the angle command value is input from the outside of the processing circuitry, calculates a second torque command value corresponding to at least the angle-side operation amount of the steering-side operation amount and the angle-side operation amount and operating the drive circuit of the electric motor to adjust the torque of the electric motor to the second torque command value.

2. The steering controller according to claim 1, wherein the second operation process includes a process that operates the drive circuit of the electric motor to adjust the torque of the electric motor to the second torque command value corresponding to both the steering-side operation amount and the angle-side operation amount.

3. The steering controller according to claim 1, wherein the second operation process includes a varying process that varies at least one of a gain indicating a degree to which the steering-side operation amount affects the second torque command value or a gain indicating a degree to which the angle-side operation amount affects the second torque command value.

4. The steering controller according to claim 1, wherein the steering-side operation amount is used for feedback control that adjusts the steering torque to a target torque.

5. The steering controller according to claim 4, wherein
the processing circuitry is configured to execute a target torque calculation process that calculates the target torque, and
the target torque calculation process includes
obtaining a conversion amount by converting each of the steering-side operation amount and the steering torque into force acting on a same object, and
calculating the target torque based on a sum of the conversion amounts.

6. The steering controller according to claim 1, wherein the processing circuitry is configured to execute a third operation process that calculates a third torque command value corresponding to the steering-side operation amount instead of the angle-side operation amount and operating the drive circuit of the electric motor to adjust the torque of the electric motor to the third torque command value in a case in which an absolute value of the steering torque is greater than or equal to a predetermined value even when the angle command value is input from the outside of the processing circuitry.

7. A steering control method for operating a steering actuator that incorporates an electric motor and steers a steerable wheel, the steering control method comprising:
calculating a steering-side operation amount based on a steering torque input by a driver, the steering-side operation amount being an operation amount of the electric motor for steering the steerable wheel and being convertible into torque required for the electric motor;
calculating an angle-side operation amount when an angle command value is input from outside, the angle command value being used to assist driving of the driver and being a command value of a convertible angle convertible into a steerable angle of the steerable wheel, the angle-side operation amount being used to adjust the convertible angle to the angle command value and being convertible into the torque required for the electric motor;
when the angle command value is not input from the outside, calculating a first torque command value corresponding to the steering-side operation amount and operating a drive circuit of the electric motor to adjust the torque of the electric motor to the first torque command value; and
when the angle command value is input from the outside, calculating a second torque command value corresponding to at least the angle-side operation amount of the steering-side operation amount and the angle-side operation amount and operating the drive circuit of the electric motor to adjust the torque of the electric motor to the second torque command value.

* * * * *